UNITED STATES PATENT OFFICE 2,471,518

NICOTINIC ACID AMIDE AND PROCESSES FOR PREPARING SAME

Bernard F. Duesel, Yonkers, and Harris L. Friedman, New York, N. Y., assignors to Pyridium Corporation, Nepera Park, N. Y., a corporation of New York No Drawing. Application August 28, 1942, Serial No. 456,728

10 Claims. (Cl. 260—295.5)

Our invention relates to improvements in the process of preparing nicotinic acid amide and particularly in the process of preparing same from 3-cyanopyridine.

The usual method of preparing nicotinic acid amide, hereafter called nicotinamide, is by treating nicotinic acid, nicotinic acid anhydride, and particularly nicotinic acid esters with ammonia under varying conditions. The process involves several steps and all start with the relatively high priced nicotinic acid.

The object of this invention is to produce nicotinamide in one step and to produce it from a relatively cheap raw material, 3-cyanopyridine.

It is a further object of our invention to convert 3-cyanopyridine into as large a proportion of nicotinamide as possible and into as small a proportion of nicotinic acid, or a nicotinate, as possible in a single step operation.

We have found that the relative proportions of nicotinamide and of nicotinates produced by the hydrolysis of 3-cyanopyridine may be controlled by the amount of alkali present in an alkaline hydrolysis of that compound.

We have further found that the proportion of nicotinamide produced by an alkaline hydrolysis of 3-cyanopyridine is in reverse proportion to the alkalinity of the hydrolysing solution; that is, the proportional amount of nicotinamide can be increased by reducing the alkalinity of the hydrolysing solution, always, of course, maintaining sufficient alkalinity to produce a partial hydrolysis and the conversion of 3-cyanopyridine into nicotinamide.

Our invention, therefore, is directed to the production of a larger proportion of nicotinamide than of nicotinic acid or nicotinate by an alkaline hydrolysis of 3-cyanopyridine, and this process is referred to herein as "partial hydrolysis".

We have found that the partial hydrolysis takes place by heating the aqueous solution of 3-pyridylnitrile in the presence of small quantities of alkalizing agents. For alkalizing agents we may employ ammonia, an alkali hydroxide, alkali bicarbonate, alkali carbonate, alkali borate, alkali acid phosphate, alkali nicotinate, acetate or other organic salts of alkalies. Hydroxides of the alkali earth metals may be used also. Organic bases, such as trimethylamine or triethylamine also act as alkalizing agents. Even water alone is sufficient for partial hydrolysis, when operated under pressure.

The partial hydrolysis as preferably employed by us, is almost quantitative and only a small quantity of nicotinate is formed from the alkali metal used.

The following examples illustrate our procedure.

Example I 110 grams 3-cyanopyridine (98% pure) are dissolved in 110 c. c. of water and boiled in a flask equipped with a reflux condenser. To this boiling solution, 28 c. c. of N sodium hydroxide solution are added very slowly. The addition should be very slow, requiring about half an hour for the 28 c. c. After the addition, the boiling is continued for another half hour to insure completion of the reaction. 80 c. c. to 85 c. c. of the water are now distilled off and the remaining concentrated solution is evaporated to dryness on the steam bath. The residue is pulverized and dried at 50°–60° C. The residue is now dissolved in about 1,300 c. c. acetone on boiling and filtered hot. The insoluble sodium nicotinate remains on the filter. The filtrate is boiled up with decolorizing carbon, refiltered and cooled down to about 25° C. to crystallize out the nicotinamide. The collected white crystals weigh about 75 grams. M. P. 128.5–129.5° C. The mother liquor can be worked up for the balance of nicotinamide and the nicotinamide remaining in solution may be converted into nicotinic acid.

Example II 20 grams 3-cyanopyridine (98% pure) are dissolved in 80 c. c. of water and placed into a pressure bottle with 20 c. c. concentrated ammonia water. The sealed bottle is placed in water, which is heated to boil and kept boiling for six hours. After cooling the aqueous solution is transferred to a Claissen flask and the water distilled off in vacuum. Any unhydrolized 3-cyanopyridine distills over with the water. The residue, an oily liquid while warm, is poured out of the flask and the flask is rinsed out with acetone. The acetone solution is added to the oily liquid and after the acetone is evaporated the oil solidifies to a crystalline mass. The crude hydrolized material weighs 20.6 grams and represents an 88% yield. The product is purified as described in Example I.

Example III 2.17 grams 3-cyanopyridine (92.3% pure) is dissolved in 10 c. c. water and 0.1 gram of sodium carbonate is added. The solution is refluxed for 3 hours and after distilling off most of the water is evaporated to dryness. The dry residue, 2.16 grams, is purified as described in previous examples and yields 1.88 grams nicotinamide, which is an 80% yield.

Example IV 2.17 grams 3-cyanopyridine (92.3% pure) is dissolved in 10 c. c. water and 0.4 grams sodium tetraborate is added. After refluxing for 3 hours, the solution is evaporated to dryness and the residue, 2.18 grams is purified as described previously. The nicotinamide obtained in this case is about 65-70%.

Example V

The following of our process in this example is similar to that described in Example I, except that sodium bicarbonate is substituted for sodium hydroxide as the alkali reagent.

Example VI

The following of our process in this example is similar to that described in Example I, except sodium acid phosphate is substituted for sodium hydroxide as the alkali reagent.

Example VII

The following of our process in this example is similar to that described in Example I, except that sodium nicotinate is substituted for sodium hydroxide as the alkali reagent and ether is substituted for acetone as the solvent.

Example VIII

The following of our process in this example is similar to that described in Example I, except that sodium acetate is substituted for sodium hydroxide as the alkali reagent.

Example IX 2.2 grams 3-cyanopyridine (90% pure) were dissolved in 50 c. c. hydrogen peroxide, U. S. P. at room temperature (20° C.) To this solution 4 drops concentrated ammonia water were added. Oxygen development started immediately and the temperature started to rise slowly. In about fifteen minutes it rose to 34° C. It was then heated in a water bath to 45°-50° C. for three quarters of an hour, when the oxygen evolution stopped. The solution was now evaporated to dryness and extracted with acetone. The 1.62 grams nicotinamide obtained from the acetone solution and recrystallized from ethyl acetate, represent a yield of 68%.

Example X 2.2 grams 3-cyanopyridine (90% pure) are added to 5 c. c. lime water, containing 0.015 gram calcium hydroxide. 3-cyanopyridine dissolves in the lime water in a few minutes, and the solution is digested on a steam bath for 2 hours. The solution is now evaporated to dryness, washed with benzene and dried. The nicotinamide so made is identified with the melting point. The weight is 1.48 grams, which represent 63% yield.

Example XI 2.2 grams 3-cyanopyridine (90% pure) were dissolved in 10 c. c. of water and 0.1 gram triethylamine was added. The solution was heated in a steam bath for 3 hours and then evaporated to dryness. The residue was washed with about 10 c. c. of benzene, in which the nicotinamide is practically insoluble, and dried again. The residue weighs 1.60 grams which represents 68% yield. The residue was completely soluble in acetone from which the nicotinamide was recrystallized.

Example XII 10.8 grams 3-cyanopyridine (90.4% pure) were dissolved in 60 c. c. isopropanol, to which solution 2 c. c. water and 0.112 gram sodium hydroxide were added. The solution was now refluxed for seven hours. The solution was then evaporated on the steam bath to dryness, the crystalline residue was pulverized and washed with benzene. The crude nicotinamide so obtained (11.7 grams, 96% yield) was purified by recrystallization from acetone.

Example XIII 0.24 gram sodium hydroxide was dissolved in 2 c. c. water and 10 c. c. methanol and this solution was added to 100 c. c. acetone. After dissolving 10.8 grams 3-cyanopyridine (96% pure) were added to the liquid which was refluxed for 6 hours. The solution was then worked up as described the Example I. The yield in this case was 7.5 grams crude nicotinamide, representing a yield of 55%.

The nicotinamide so produced and purified forms a white crystalline powder with a melting point of 128.5°-129.5° C. It is very soluble in water, less soluble in alcohol, glycerine and acetone, slightly soluble in ether and practically insoluble in benzene.

It should be observed that while the previous processes for the production of nicotinamide employ expensive nicotinic acid as a starting material and then work back to nicotinamide, we employ the less expensive 3-cyanopyridine as a starting material and in one step produce nicotinamide with the production of as small a quantity as possible of nicotinate, which can be readily converted into nicotinic acid if desired.

Having so described our invention, we do not limit ourselves to the specifically mentioned times, temperatures, quantities, chemicals or steps of procedure as these are given simply to clearly describe our invention as set forth in our specification and claims and they may be varied without going beyond the scope of our invention.

What we claim is:

1. A process for producing nicotinamide which comprises heating 3-cyano-pyridine in the presence of an aqueous solution of ammonia.

2. A process for producing nicotinamide which comprises, heating 3-cyanopyridine in the presence of an aqueous solution of ammonia in a quantity not substantially in excess of that amount required to produce an alkalinizing strength equivalent to that effected by sodium hydroxide in an amount of about 2.5% of the weight of said nitrile.

3. The process of producing nicotinamide which comprises partially hydrolyzing 3-cyanopyridine by subjecting the same only to the action of an inorganic alkalizing agent in aqueous solution, said agent being employed in a quantity not substantially in excess of that required to produce an alkalinizing strength equivalent to that effected by sodium hydroxide in an amount of about 2½% of the weight of said 3-cyanopyridine.

4. A process for producing nicotinamide which comprises partially hydrolyzing 3-cyanopyridine by subjecting the same only to the action of sodium hydroxide in aqueous solution, said hydroxide being employed in a quantity not substantially in excess of about 2½% of the weight of said 3-cyanopyridine.

5. The process of producing nicotinamide which comprises partially hydrolyzing 3-cyanopyridine by subjecting the same only to the action of an alkali carbonate in aqueous solution, said agent being employed in a quantity not substantially in excess of that required to produce an alkalinizing strength equivalent to that effected by sodium hydroxide in an amount of about 2½% of the weight of said 3-cyanopyridine.

6. A process for the production of nicotinamide which comprises slowly adding to an aqueous solution of 3-cyanopyridine a hydrolyzing agent consisting essentially only of an aqueous solution of an inorganic alkalizing agent, said agent being present in a small amount not substantially in excess of that which produces an alkalinizing strength equivalent to that effected by sodium hydroxide in an amount of about 2½% of the weight of said 3-cyanopyridine.

7. A process for the production of nicotinamide in yields in excess of 55% which comprises, mixing 3-cyanopyridine with an aqueous solution containing therein substantially only an inorganic alkalizing agent in a quantity not substantially in excess of that which produces an alkalinizing strength equivalent to that effected by sodium hydroxide in an amount of about 2½% of the weight of said 3-cyanopyridine, heating and boiling the resulting mixture until the partial hydrolysis of the 3-cyanopyridine is caused by the action of the aqueous solution containing the alkalizing agent.

8. A process for the production of nicotinamide which comprises hydrolyzing 3-cyanopyridine by slowly adding to a boiling aqueous solution under reflux of 3-cyanopyridine a hydrolyzing agent consisting essentially only of an aqueous solution of an inorganic alkalizing agent in an amount not substantially in excess of that required to produce an alkalizing strength equivalent to that effected by sodium hydroxide in an amount of about 2½% of the weight of said 3-cyanopyridine and heating and refluxing the resulting mixture until the 3-cyanopyridine is hydrolyzed by the aqueous solution of said alkaline substance and nicotinamide is formed containing a small amount of nicotinate.

9. The process of producing nicotinamide which comprises partially hydrolyzing 3-cyanopyridine by heating the same in a solution containing as the sole essential hydrolyzing agent an aqueous solution of sodium hydroxide in a quantity of about 1% of the weight of said nitrile whereby the greater proportion of the 3-cyanopyridine is converted only to nicotinamide.

10. In the alkaline hydrolysis of 3-cyanopyridine the process of stopping the hydrolysis of the larger portion of the said reactant at the nicotinamide stage which comprises, subjecting the 3-cyanopyridine to a hydrolyzing solution consisting only of an aqueous solution containing a small amount of an inorganic alkalizing agent in aqueous solution, the amount of said agent being not substantially in excess of that required to produce an alkalizing strength equivalent to that effected by sodium hydroxide in an amount of about 1% of the weight of said 3-cyanopyridine.

BERNARD F. DUESEL.
HARRIS L. FRIEDMAN.

REFERENCES CITED

The following references are of record in the file of this patent:

UNITED STATES PATENTS

| Number | Name | Date |
|---|---|---|
| 2,409,806 | Shive | Oct. 22, 1946 |

FOREIGN PATENTS

| Number | Country | Date |
|---|---|---|
| 488,642 | Great Britain | 1936 |

OTHER REFERENCES

Lucas, "Organic Chemistry" (1935), p. 295, American Book Co., N. Y.

Sidgwick, "Organic Chemistry of Nitrogen Compounds," p. 139 (1942).

Georg, "Helv. Chemica Acta," vol. 26 (1943), pp. 358–362, December 29, 1942.

Annalen, 487, p. 131.